June 2, 1942.   H. C. GRANT, JR   2,284,650
DISPENSING DEVICE
Filed Dec. 24, 1937   3 Sheets-Sheet 1
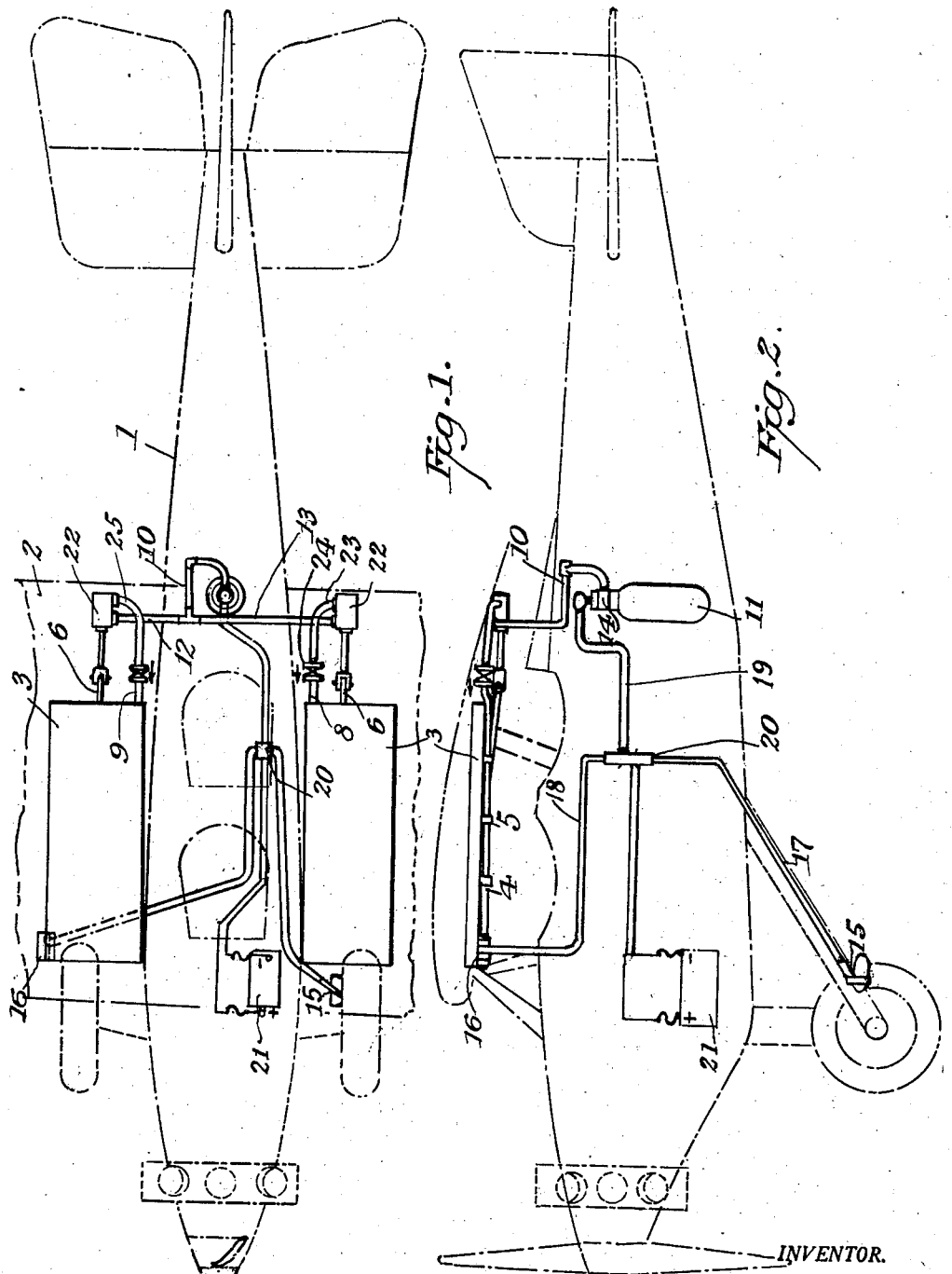
INVENTOR.
HARRY C. GRANT, JR.
BY J. William Carson
ATTORNEYS.

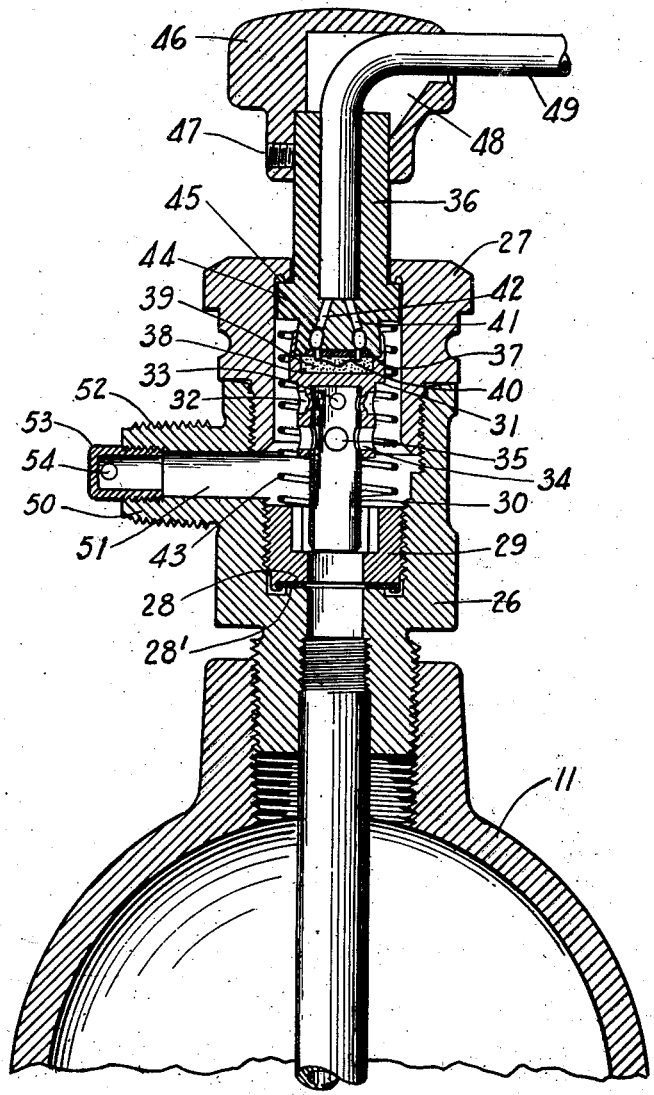

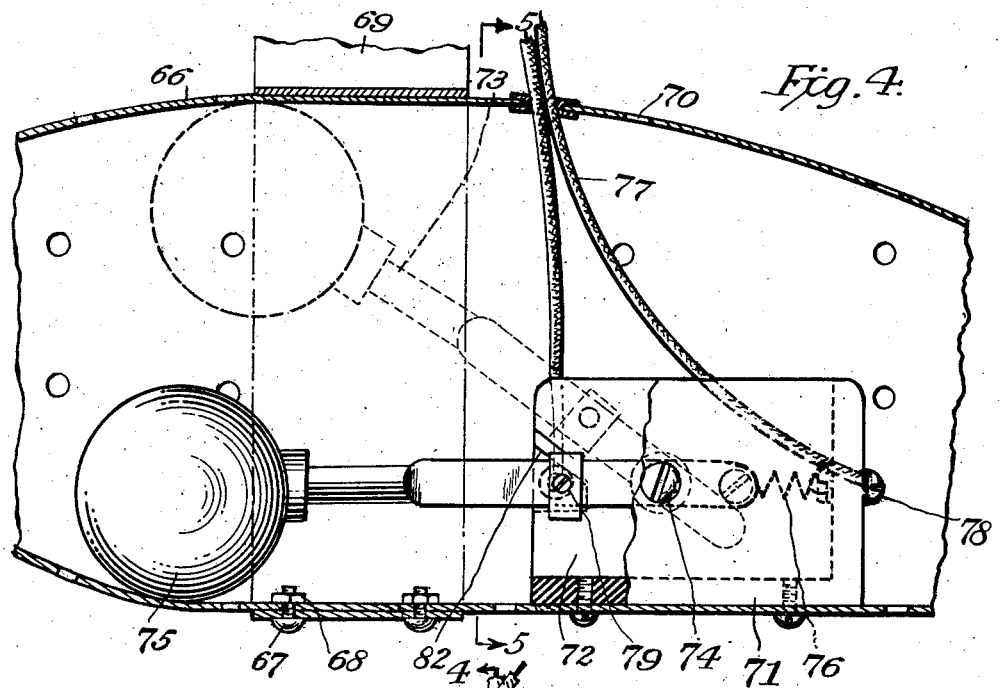

Patented June 2, 1942

2,284,650

UNITED STATES PATENT OFFICE 2,284,650

DISPENSING DEVICE

Harry Campbell Grant, Jr., New York, N. Y., assignor to Specialties Development Corporation, Bloomfield, N. J., a corporation of New Jersey Application December 24, 1937, Serial No. 181,561

21 Claims. (Cl. 221—73.5)

The present invention relates to aircraft flotation systems of the type that comprises an arrangement of a plurality of inflatable bags on the aircraft which are adapted to be inflated with a buoyant fluid or gas when the aircraft descends upon a body of water. When thus inflated, the bags form buoyant floats for supporting the aircraft and prevent it from sinking.

It is of course important in connection with aircraft flotation equipment of this nature, that the inflation of the bags should take place immediately on the contact of the aircraft with the water, and it is also of great importance that the buoyant fluid should not be released prior to the alighting of the aircraft upon the water, since the great resistance offered by the inflated bags to the travel of the aircraft through the air would be dangerous.

In order to eliminate, as far as possible, the human factor in the operation of equipment of this nature, the present invention provides a structure wherein the supply of buoyant fluid is automatically released to inflate the inflatable bags upon contact of the aircraft with any body of water on which it should happen to alight.

While the illustrative embodiment of the present invention incorporates certain features of the apparatus shown and described in Letters Patent of the United States No. 2,067,065, it differs therefrom in the provision of novel releasing means for the buoyant fluid, which are at the same time both automatically operable upon the closing of an electric circuit when the aircraft descends upon a body of water and manually operable by means of a supplementary manual control.

Previous electrically operated releasing means for buoyant fluids in aircraft flotation systems have suffered from too complicated a mechanism, especially when combined with a manual control; and it is therefore an object of the present invention to provide an aircraft flotation gear which is both light in weight and which possesses great reliability in operation both automatically and manually due to its simple and compact construction. In connection with the last named object, an important feature of the present invention is the manner of combining the electrically and manually operable means for releasing the buoyant fluid into a compact unit.

Another object of the invention is to provide an aircraft flotation system wherein the supply of buoyant fluid is automatically released from a single container or a plurality of containers thereof to inflate the inflatable bags upon contact of the aircraft with any body of water upon which it should alight.

A further object is to provide a system of the above character which functions automatically upon initial contact of the aircraft with water regardless of whether the aircraft alights upon the water in an upright or in an inverted position.

A still further object of the invention is to provide a simple manual release for the buoyant fluid in case of failure of the automatic release, which makes use of the automatic releasing means without any additional mechanism beyond a few structural modifications.

In the preferred embodiment of the invention, the buoyant fluid or gas is contained in a pressure container sealed by a frangible disc adapted to be pierced by a puncturing member normally maintained out of contact with the frangible disc but operable to penetrate the disc by the propelling force of an explosion of a powder charge, set off by the closing of an electric circuit by a float controlled switch when the aircraft descends upon a body of water. The piercing member is also operable manually, providing for an emergency in case for any reason the electrically fired powder charge should fail to explode when the aircraft descends upon the water. The piercing means or disc cutter, in the preferred form of the invention, is designed to operate as a projectile, its upper portion being adapted to receive the powder charge and at the same time to securely attach the projectile-cutter portion to a stem-like supporting member, thus forming an otherwise manually operable structurally coherent disc piercing unit. The projectile-cutter, upon firing of the powder charge, is adapted to disengage itself from the otherwise manually operable assembly, somewhat as a rifle ball will disengage itself from its cartridge, and to pierce the frangible closure disc in a bullet-like manner.

A still further object is to provide an explosion actuated fluid releasing mechanism in which the projectile-cutter and explosive charge form a unitary structure, which is replaceable as such, thus simplifying the reconditioning of the apparatus after use and promoting fool-proof operation by the utilization of factory made replacement units.

Still another object of the invention is to provide a flotation system which will afford the maximum exchangeability of integral parts.

Further objects and features, not specifically enumerated above, will be apparent as the invention is described in greater detail in connection with the accompanying drawings, wherein:

Figure 1 is a plan view showing flotation equipment constructed in accordance with the present invention and applied to an aeroplane which is indicated in broken lines.

Figure 2 is a view in side elevation showing the equipment of Figure 1 and likewise the aeroplane upon which it is installed, the aeroplane being shown in broken lines.

Figure 3 is a view in transverse section showing a fluid releasing mechanism constructed in accordance with the invention.

Figure 4 is an enlarged view, partly in section, of a electrical actuator in accordance with the invention.

Figure 5 is a view taken on the line 5—5 of Figure 4 and looking in the direction of the arrows.

Referring to Figures 1 and 2 of the drawings, an aeroplane fuselage is indicated at 1, and the wing of the aeroplane at 2. On the underneath side of the wing and within the streamline of the wing are set flotation bag containers 3, each containing a normally deflated flotation bag retained within the container by means of wires 4 which pass through ringlets 5 to maintain the cover of each container closed. In order that the flotation bags may be secured effectively to the plane, rope loops are secured to the bags and in turn to the structure of the wing of the plane. A cable or rod 6 operates all of the wires 4 to disengage the ringlets 5, thus enabling a container 3 to be opened. When, therefore, a flotation bag is inflated by a compressed fluid, such as air or carbon dioxide, the bag expands and frees itself from the container, the cover being so constructed as to permit the bag to assume its inflated position. For the purpose of expanding the flotation bags, conduits 8 and 9 are connected to the respective bags, the conduits being respectively connected by a common delivery conduit 10 to the pressure medium container 11.

The pressure medium container 11 is provided with releasing means 14, described in detail hereinafter, the releasing means being set in operation by the flowing of an electric current due to the closing of an electric circuit, which is normally open, but which is closed upon immersion in water of one of the electrical switches or actuator members 15 or 16, the circuit wires from the actuators being run through the tubes 17 and 18 to the electrical conduit 19 through an electrical junction box 20, the electrical circuit including a source of electrical potential 21 and an electrical element of the releasing means 14.

Upon release of the medium within the pressure medium container 11, it passes through discharge lines 12 and 13 into one end of a piston bag release 22, driving the piston toward the right, as viewed in Figures 1 and 2, and disengaging the wires 4 from the ringlets 5. When the piston in the piston bag release 22 reaches the end of its stroke, the medium escapes through conduits 23 and 25, check valves 24, and the conduits 8 and 9 into the flotation bags, thus causing them to expand in accordance with the pressure of the medium. During the inflation of the bags, the covers of the containers 3 containing such bags lift so as to permit the free inflation of the bags. By providing a check valve as indicated at 24, the medium which has expanded into the flotation bags is prevented from escaping therefrom, continued passage of the medium into the bags being freely permitted.

Referring now to Figure 3 of the drawings, a container 11 is provided, within which a supply of a medium under pressure, usually compressed carbonic acid, is maintained by means of a valve body 26 and a bonnet 27. The valve body 26 is threaded into the top of the container 11 and is provided with a frangible disc closure 28 and a sealing gasket 28' secured in position by a plug 29 threaded in to the valve body 26. A hollow cutter 30 is movable within the plug 29, the cutter being clinched into a coupling member 31 by punching in circular depressions 32 on the outside of the coupling member which are in line with openings 33 in the wall of the cutter 30. Openings 34 in the coupling member 31 are in line with corresponding openings 35 in the cutter, and serve as discharge passages for the fluid medium. The cup-shaped upper portion of the coupling member 31 is spun tightly onto the lower inverted frustrated-cone-shaped portion of the stem 36, the shoulder 37 bearing against said lower end of the stem 36. Within said cup-shaped portion of the coupling member 31 is formed a circular recess 38 which is adapted to receive a powder charge 39 and a fusible wire 40, which is conductively secured to the ends of insulated electrical conductors 41 and 42 disposed centrally within the stem 36. An expansion spring 43 is disposed around the cutter assembly, 30—31, its lower end resting against the plug 29 while its upper end bears against the lower side of a flange 44 of the stem 36, thus urging the stem and with it the entire attached cutter assembly away from the disc closure 28. The upper part of the flange 44 seats against a seat 45 formed inwardly in the upper part of bonnet 27, serving to limit the movement upward of the stem and cutter assembly and to seal the bonnet against the escape of the pressure medium when the stem 36 is in its uppermost position. A knob 46 is secured to the top of the stem 36 and held in place by a set screw 47. A passage 48 is formed within the knob 46 allowing for the conductors 41 and 42 within a cable 49 to be led to the outside. A boss 50, formed on the valve body 26, is centrally bored to form an escape passage 51 for the gas in the container 11, threads 52 providing for attachment of an outlet conduit, while a recoil preventing outlet plug 53 threaded into escape passage 51 serves to eliminate any recoil effect due to the escape of the high pressure medium at a time when the outlet conduit (not shown in Fig. 3) is unconnected, suitable passages 54 serving to produce opposed balanced jets of the pressure medium.

The stem 36 is preferably made of a moulded insulating material, the ends of the insulated electrical conductors, which are usually of stranded wire, being first prepared by soldering them to bind the wires and inserting the soldered ends in a spacer disc of insulating material. The fusible wire 40 is secured to the ends of the conductors after the moulding operation; and the powder charge is then placed in the recess 38, after which the coupling member 31 is secured to the stem to complete the unitary structure.

The preferred construction of the electrical actuators 15 and 16 will now be described in detail in connection with Figures 4 and 5, in which 66 represents a streamline receptacle having secured thereto by means of screws 67 and nuts 68, an encompassing strap 69 serving to secure the receptacle 66 in any desired position. The receptacle 66 is provided with numerous openings 70 to permit entry of water upon the immersion of the receptacle in water, so as to actuate the circuit closing mechanism contained within the receptacle. This circuit closing mechanism comprises a mounting block 71 of insulating material, the mounting block being chambered at 72 in order to receive an operating lever 73, which is pivoted on the mounting block by means of a pivoting screw 74. On one end of the lever 73 is arranged a ball float 75, while the other end of the lever is connected, by means of a relatively stiff electrically conductive spring 76, to an electrical conductor 77, which is secured to a screw 78 passing through the end of the mounting block 71 and engaging the one end of the spring 76; the spring serving not only to render the lever electrically active, but also to prevent movement of the lever due to jarring, thereby preventing undesirable closing of the electrical circuit. Of course, the spring 76 is not made stiff enough to resist the rotation of the lever when the ball float 75 is immersed in water.

The actuators 15 and 16 may of course both be constructed to operate when the aeroplane settles in an upright position, or any one of the actuators may be modified in any suitable manner to operate when the aeroplane falls in an inverted position.

Mounted on the lever 73, by means of screws 79, is a spring contact element 80, the ends 81 of which are arranged to press against the side walls of the chambered portion of the mounting block 71 and to engage metallic plates 82 inserted within, but lying flush with the side walls of the chamber of the mounting block. One of these metallic plates is electrically connected, by means of a screw 83, to an electrical conductor 84.

With this construction, when the receptacle 66 is immersed in water, the water enters the receptacle through the openings 70, causing the ball float 75 to rise and to carry with it the lever 73, whereby the ends 81 of the spring contact 80 carried by the lever 73 engage the metallic plates 82, thus causing an electrical circuit to be completed from the electrical conductor 77, through the screw 78, the spring 76, the lever 73, the spring contact element 80, and that one of the metallic plates 82 which is electrically connected by means of the screw 83 to the electrical conductor 84; so that by this construction, there is provided a simple and effective means for closing an electrical circuit upon the immersion of the actuator in water.

In view of the fact that the electrical circuit need only be closed momentarily, and in order to reopen the circuit after it has accomplished its useful purpose, recesses 85 are arranged in the side walls of the chambered portion of the mounting block 71 within the path of movement of the spring contact element 80, so that upon a continued rise of the ball float 75, the ends 81 of the spring contact element 80 will spring outwardly into the recesses 85, thus preventing the lever 73 from returning to its normal position and thus closing the circuit again during its return movement. Of course, the lever 73 may be returned to its normal position when desired by compressing the ends 81 of the spring contact element 80.

The operation of the invention is quite apparent from the foregoing description. As soon as the aircraft descends upon water, the float controlled switches 15 or 16 close an electric circuit from the source 21 through the switches 15 or 16, which are in parallel and thus form alternative paths for the current, junction box 20, conductor 41, and fusible wire 40, returning through conductor 42 to the source. On passage of current through the fusible wire 40, the powder charge 39 is ignited, causing, due to the pressure thus developed, the coupling member 31 and cutter 30 to detach themselves from the lower end of the stem 36 and the cutter to be propelled, projectile-like, through the frangible closure disc 28. The gas confined in container 11 under pressure, is now free to escape via the openings 35 in the hollow cutter 30 and the openings 34 in the coupling member 31 in line with the openings 35, through escape passage 51 and the passages 54 of the recoil preventing outlet plug 53, and through conduits 10, 12, and 13, causing the piston bag releases 22 to operate, thus releasing inflatable bags within the containers 3 and permitting the medium thus released to inflate the bags to form buoyant floats preventing the sinking of the aircraft. It will be also apparent from the aforesaid that, in case the automatic release should fail to operate, manual release of the pressure medium can be effected by simply striking the knob 46, causing a downward movement of the now unitarily used structure comprising the stem 36, the coupling member 31, and the cutter 30, thus piercing the frangible closure disc 28 and permitting the buoyant pressure medium to escape as before. In this case, the spring 43 will force the cutter and stem structure back to its former position, although still permitting the escape of the pressure medium.

It will be apparent that in order to make the system operable again, replacement must be made of the frangible disc closure 28, the cutter-coupling-stem assembly 30—31—36, and the powder charge 39; and in order to simplify the replacement and assure proper assembly of the various elements, the cutter, coupling, stem and powder charge are formed into a unitary structure; so that spare units, factory built and tested, can be substituted for the used elements by simply removing the old unit and inserting the new one.

It will of course be readily apparent that the present invention is adaptable for other purposes than in connection with aircraft flotation gear.

From the foregoing description, it will be seen that I have provided simple and effective means for releasing pressure fluid from one or more containers thereof, and it will be further seen that my invention accomplishes the various objects pointed out at the beginning of this specification. Finally, while my invention resides in certain principles of construction and operation which have been illustrated and described in connection with the accompanying drawings, it will be apparent to those skilled in the art that the invention may be embodied in other forms of construction without departing in any manner from the spirit and scope of the invention, and I therefore do not wish to be strictly limited to the disclosure, but rather to the scope of the appended claims.

I claim:

1. In a control device for a fluid medium confined in a container under pressure, a chambered body member having a passage for communication with the container and provided with a frangible closure for the passage and with an outlet for the fluid medium, supporting means disposed in said body chamber, a cutter attached to said supporting means, and means to forcibly detach the cutter from said supporting means and propel it toward and through the frangible closure to effect release of the fluid medium.

2. In a control device for a fluid medium confined in a container under pressure, a chambered body member having a passage for communication with the container and provided with a frangible closure for the passage and with an outlet for the fluid medium, supporting means movable in said body member, a cutter attached to said supporting means out of contact with any other part of the device, automatically operable means to forcibly detach the cutter from said supporting means and propel it through the frangible closure, and means to manually depress said supporting means with the cutter to move the cutter toward and through the frangible closure to effect release of the fluid medium.

3. In a control device for a fluid medium confined in a container under pressure, a chambered body member provided with a frangible closure for the container and with an outlet, supporting means disposed in said body chamber, a hollow tubular cutter attached to said supporting means, said tubular cutter being provided with outlets in the wall thereof, and means to forcibly detach the cutter from said supporting means and propel it toward and through the frangible closure to effect release of the fluid medium through the hollow cutter, the opening therein, and the outlet in the chambered body.

4. In a control device for a fluid medium confined in a container under pressure, a chambered body member provided with a frangible closure for the container and with an outlet, supporting means disposed in said body chamber, a cutter attached to said supporting means, and means to forcibly detach the cutter from said supporting means, disposed between said cutter and supporting means, to cause said cutter to be shot through the frangible closure to effect release of the fluid medium.

5. In a control device for a fluid medium confined in a container under pressure, a chambered body member provided with a frangible closure for the container and with an outlet, supporting means disposed in said body chamber, a hollow tubular cutter attached to said supporting means and having outlets in the wall thereof, and means to forcibly detach the cutter from said supporting means, disposed between said cutter and supporting means, to cause said cutter to be shot through the frangible closure to effect release of the fluid medium through the hollow cutter, the openings therein, and the outlet in the chambered body.

6. In a control device for a fluid medium confined in a container under pressure, a chambered body member provided with a frangible closure for the container and with an outlet, closure means for said body member, supporting means movably disposed in said body chamber and extending exteriorly of said closure means, a hollow tubular cutter attached to said supporting means and having outlets in the wall thereof, means to normally urge the cutter and supporting means away from the frangible closure, means to forcibly detach the cutter from said supporting means, disposed between said cutter and supporting means, means adapted under given conditions to automatically render said last named means effective to cause said cutter to be shot through the frangible closure, to effect release of the fluid medium through the hollow cutter, the openings therein, and the outlet in the chambered body, and manually operable means to depress said supporting means and cutter as a unit to move the cutter toward and through the frangible closure, to effect the release of the fluid medium.

7. In a control device for a fluid medium confined in a container under pressure, a chambered body member having a passage for communication with the container and provided with a frangible closure for the passage and with an outlet for the fluid medium, supporting means movable in said body chamber and extending exteriorly of the body member, a cutter attached to said supporting means out of contact with any other part of the device, and means to forcibly detach the cutter from said supporting means and propel it through the frangible closure, said supporting means being adapted to be depressed with the cutter to move the cutter toward and through the frangible closure to effect release of the fluid medium.

8. In a control device for a fluid medium confined in a container under pressure, a chambered body member having a passage for communication with the container and provided with a frangible closure for the passage, with an outlet for the fluid medium, and with an opening in alignment with the frangible closure, supporting means movable in said body chamber and extending through said opening and exteriorly of the body member, a cutter attached to said supporting means out of contact with any other part of the device, a seat encompassing said opening adapted for sealing engagement with the supporting means, means normally urging the supporting means with the cutter away from the frangible closure into engagement with said seat, and means to forcibly detach the cutter from said supporting means and propel it through the frangible closure, said supporting means being adapted to be depressed with the cutter toward and through the frangible closure to effect release of the fluid medium.

9. In a control device for a fluid medium confined in a container under pressure, a chambered body member having a passage for communication with the container and provided with a frangible closure for the passage and with an outlet for the fluid medium, supporting means in said body chamber provided with a depending boss, a cutter in said chamber having deformable upwardly extending means adapted to be clamped over said boss to hold the cutter out of contact with the frangible closure, and an explosive charge arranged in a recess between adjacent surfaces of the supporting means and the cutter, said explosive charge being adapted to be activated by means extending into said supporting means to forcibly detach the cutter from said supporting means and propel it through the frangible closure.

10. In a control device for a fluid medium confined in a container under pressure, a chambered body member having a passage for communication with the container and provided with a frangible closure for the passage and with an outlet for the fluid medium, supporting means in said body, a projectile-like member in said body chamber, means adapted to secure said projectile-like member to said supporting means to hold the member out of contact with the frangible closure, and a confined explosive charge arranged adjacent said projectile-like member, said explosive charge being adapted to be activated by means extending into said supporting means to forcibly detach the projectile-like member from said supporting means and propel it through the frangible closure.

11. In a control device for a fluid medium confined in a container under pressure, a chambered body member having a passage for communication with the container and provided with a frangible closure for the passage and with an outlet for the fluid medium, and a replaceable unitary structure associated with the body member comprising supporting means, a projectile-like member, means adapted to secure said projectile-like member to said supporting means to hold the member out of contact with the frangible closure, and a confined explosive charge arranged adjacent said projectile-like member, said explosive charge being adapted to be activated by means extending into said supporting means to forcibly detach the projectile-like member from said supporting means and propel it through the frangible closure.

12. In a control device for a fluid medium confined in a container under pressure, a chambered body member having a passage for communication with the container and provided with a frangible closure for the passage and with an outlet for the fluid medium, and a replaceable unitary structure associated with the body member comprising supporting means, a projectile-like member, means adapted to secure said projectile-like member to said supporting means to hold the member out of contact with the frangible closure, and a confined explosive charge arranged adjacent said projectile-like member, said explosive charge being adapted to be activated by means extending into said supporting means to forcibly detach the projectile-like member from said supporting means and propel it through the frangible closure, and said unitary structure being adapted to be depressed to cause the projectile-like member to penetrate the frangible closure.

13. A fluid pressure medium dispensing apparatus comprising a container for the fluid, a frangible closure for the container, a fluid dispensing member disposed on the container, supporting means in said dispensing member, and an explosive actuated projectile detachably secured to said supporting means and adapted to be shot therefrom and through said closure upon being actuated.

14. A fluid pressure medium dispensing apparatus comprising a container for the fluid, a frangible closure for the container, a fluid dispensing member disposed on said container, supporting means in said dispensing member, an explosive actuated projectile detachably secured to said supporting means and adapted to be shot therefrom and through said closure upon being actuated, and projectile travel limiting means in the member.

15. A fluid pressure medium dispensing apparatus comprising, a container for the fluid, a frangible closure for the container, a fluid dispensing housing on said container, supporting means in said housing extending outside thereof and movable with respect thereto, an explosive actuated projectile detachably secured to said supporting means and adapted to be shot therefrom and through said closure, and actuating means for said supporting means, whereby, upon said actuating means being acted upon by an outside agency, the supporting means and the projectile are moved as a unit toward the closure with respect to the housing to penetrate said closure.

16. A fluid pressure medium dispensing apparatus comprising a container for the fluid, a frangible closure for the container, a fluid dispensing housing on said container, supporting means in said housing extending outside thereof and movable with respect thereto, an explosive actuated projectile detachably secured to said supporting means and adapted to be shot therefrom and through said closure, actuating means for said supporting means, and projectile travel limiting means in said housing, whereby, upon said actuating means being acted upon by an outside agency, the supporting means and the projectile are moved as a unit toward the closure with respect to the housing to penetrate said closure until stopped by said travel limiting means.

17. A fluid pressure medium dispensing apparatus comprising a container for the fluid, a frangible closure for the container, a fluid dispensing member disposed on the container, supporting means in said dispensing member, and an explosive actuated projectile in form of a tubular cutter detachably secured to said supporting means and adapted to be shot therefrom and through said closure upon being actuated.

18. A fluid medium dispensing device adapted for application to a container for a fluid medium under pressure closed by a frangible closure, comprising a fluid dispensing member adapted to be secured over the closure of said container, supporting means in said dispensing member, and an explosive actuated projectile detachably secured to said supporting means and adapted to be shot therefrom and through said closure upon being actuated.

19. A fluid dispensing apparatus comprising a container for a fluid medium, a frangible closure for the container, a fluid dispensing member disposed on said container, supporting means in said dispensing member, a projectile, an explosive charge adjacent said projectile detachably secured to said supporting means, and explosive charge activating means operatively associated with said charge, whereby upon activation of said explosive charge said projectile is adapted to be shot from its supporting means and through said closure until stopped by said travel limiting means.

20. A fluid dispensing apparatus comprising a container for a fluid medium, a frangible closure for the container, a fluid dispensing member disposed on said container, supporting means in said dispensing member, a projectile detachably secured to said supporting means, travel limiting means in said member, an explosive charge adjacent said projectile, and explosive charge activating means operatively associated with said charge, whereby upon activation of said explosive charge said projectile is adapted to be shot from its supporting means and through said closure until stopped by said travel limiting means.

21. A fluid dispensing apparatus comprising a container for a fluid medium, a frangible closure for the container, a fluid dispensing member disposed on said container, supporting means in said dispensing member, a projectile in the form of a tubular cutter detachedly secured to said supporting means, an explosive charge adjacent said projectile, and explosive charge activating means operatively associated with said charge, whereby upon activation of said explosive charge said projectile is adapted to be shot from its supporting means and through said closure until stopped by said travel limiting means.

HARRY CAMPBELL GRANT, Jr.

(Over)

CERTIFICATE OF CORRECTION.

Patent No. 2,284,650.                         June 2, 1942.

HARRY CAMPBELL GRANT, JR.

It is hereby certified that error appears in the printed specification of the above numbered patent requiring correction as follows: Page 5, second column, lines 36 and 37, claim 19, strike out "detachably secured to said supporting means" and insert the same after "projectile" and before the comma in line 35, same claim; and line 49, claim 20, before "travel" insert --projectile--; and that the said Letters Patent should be read with this correction therein that the same may conform to the record of the case in the Patent Office.

Signed and sealed this 1st day of September, A. D. 1942.

Henry Van Arsdale, (Seal)                         Acting Commissioner of Patents.